US007432902B2

(12) United States Patent
Yun

(10) Patent No.: US 7,432,902 B2
(45) Date of Patent: Oct. 7, 2008

(54) LIQUID CRYSTAL DISPLAY DEVICE AND DRIVING METHOD THEREOF

(75) Inventor: Jae Kyeong Yun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 738 days.

(21) Appl. No.: 11/016,736

(22) Filed: Dec. 21, 2004

(65) Prior Publication Data

US 2005/0156851 A1 Jul. 21, 2005

(30) Foreign Application Priority Data

Dec. 29, 2003 (KR) ..................... 10-2003-0099248

(51) Int. Cl.
*G09G 3/36* (2006.01)
*G09G 5/00* (2006.01)
*G06F 3/038* (2006.01)

(52) U.S. Cl. .......................... 345/96; 345/89; 345/690; 345/209

(58) Field of Classification Search ............ 345/87–89, 345/96, 204, 690, 209
See application file for complete search history.

(56) References Cited

U.S. PATENT DOCUMENTS

| | | | | |
|---|---|---|---|---|
| 5,657,044 | A * | 8/1997 | Makino | 345/103 |
| 2002/0186192 | A1* | 12/2002 | Maruoka et al. | 345/87 |
| 2002/0196221 | A1* | 12/2002 | Morita | 345/87 |
| 2003/0085865 | A1* | 5/2003 | Lee et al. | 345/98 |
| 2003/0095088 | A1* | 5/2003 | Ham | 345/87 |
| 2004/0119730 | A1* | 6/2004 | Ham et al. | 345/692 |

* cited by examiner

*Primary Examiner*—Amr Awad
*Assistant Examiner*—Stephen G Sherman
(74) *Attorney, Agent, or Firm*—Morgan, Lewis & Bockius LLP

(57) ABSTRACT

A liquid crystal display (LCD) device includes an LCD panel, a frequency multiplier to multiply a frame frequency to generate a multiplied frame frequency that includes an odd frame and an even frame, a data converter to modulate N-bit input data supplied in accordance with the odd and even frames from the frequency multiplier into (N−1)-bit data, and a data driver to apply the (N−1) bit data from the data converter to the LCD panel.

12 Claims, 12 Drawing Sheets

LIQUID CRYSTAL DISPLAY DEVICE AND DRIVING METHOD THEREOF

This application claims the benefit of Korean Patent Application No. P2003-99248 filed in Korea on Dec. 29, 2003, which is hereby incorporated by reference.

BACKGROUND OF THE INVENTION

1. Field of the Invention

The present invention relates to a liquid crystal display, and more particularly, to a liquid crystal display with a simplified data driving circuit structure and a method of driving the liquid crystal display.

2. Discussion of the Related Art

Generally, a liquid crystal display (LCD) displays a picture using an electric field to control light transmittance of a liquid crystal. To this end, the LCD includes an LCD panel having liquid crystal cells arranged in a matrix type, and a driving circuit for driving the LCD panel. The LCD is readily designed to have a dimension much smaller than any CRT tube to meet market's desires for a display device installed in a portable television, a lap-top personal computer, or the like.

FIG. 1 is a schematic block circuit diagram illustrating a configuration of a related art LCD. As shown in FIG. 1, the related art LCD includes an LCD panel 2 having liquid crystal cells arranged in a matrix form, a data driver 4 for driving data lines DL1 through DLm of the LCD panel 2, a gate driver 6 for driving gate lines GL1 through GLn of the LCD panel 2, a timing controller 8 for controlling the data and gate drivers 4 and 6, and a reference gamma voltage generator 9 for supplying 16 reference gamma voltages GM1 through GMA16 to the data driver 4.

The LCD panel 2 includes a thin film transistor TFT provided at each intersection between the data lines DL1 through DLm and gate lines GL1 through GLn, and a liquid crystal cell 7 connected to the thin film transistor TFT. The thin film transistor TFT is turned on at the time of receiving a scanning signal, namely, a gate high voltage VGH from the gate line GL, thereby applying an analog data from the data line DL to the liquid crystal cell 7. On the other hand, the thin film transistor TFT is turned off at the time of receiving a gate low voltage VGL from the gate line GL, thereby keeping the analog data charged in the liquid crystal cell 7.

The liquid crystal cell 7 may be equivalently regarded as a liquid crystal capacitor. The liquid crystal cell 7 includes a common electrode and a pixel electrode connected to the thin film transistor. The common electrode and pixel electrode are opposed to each other and a liquid crystal is arranged therebetween. Also, the liquid crystal cell 7 includes a storage capacitor for keeping a stable maintenance of the charged analog data signal until the analog data is charged. This storage capacitor is provided between the pixel electrode and a pre-stage gate line. The liquid crystal cell 7 varies an alignment state of the liquid crystal having a dielectric anisotropy in accordance with analog data charged through the thin film transistor TFT to control light transmittance, thereby implementing gray scale levels.

FIG. 2 is a block diagram of the timing controller 8 of FIG. 1. As shown in FIG. 2, the timing controller 8 generates gate control signals (i.e., GSP, GSC, GOE, etc.) for controlling the gate driver 6, and data control signals (i.e., SSP, SSC, SOE, POL, etc.) for controlling the data driver 4 based on various control signals DE, Hsync, Vsync and DCLK supplied externally. Also, the timing controller 8 aligns 8-bit data RGB supplied externally for driving the LCD panel 2, and applies them to the data driver 4. Specifically, the timing controller 8 includes a data processor 32 for aligning the external 8-bit data so that they are suitable for driving the LCD panel 2 and re-arranging them, and a control signal generator 34 for utilizing the various external control signals to generate the gate control signals GSP, GSC, GOE, etc. as well as the data control signals SSP, SSC, SOE, POL, REV, etc.

More specifically, the data processor 32 aligns the 8-bit data into odd data ODD Data and even data EVEN Data so that they are suitable for driving the LCD panel 2, and supplies aligned data Data to the data driver 4. The control signal generator 34 generates the data control signals SSP, SSC, SOE, POL, REV, etc. to apply them to the data driver 4 and, at the same time, generates the gate control signals GSC, GSP, GOE, etc. to apply them to the gate driver 6 with the aid of a data enable signal DE informing an effective data interval, a horizontal synchronizing signal Hsync, a frame frequency Vsync and a dot clock DCLK for determining a transmission timing of the aligned data Data.

To sequentially drive the gate lines GL1 through GLn, the gate driver 6 is provided with a plurality of gate driving integrated circuits (ICs) (not shown). The gate driving ICs sequentially drive the gate lines GL1 through GLn under control of the timing controller 8. In other words, the gate ICs sequentially apply a gate high voltage VGH to the gate lines GL1 through GLn in response to the gate control signals GSP, GSC, GOE, etc. from the timing controller 8. The reference gamma voltage generator 9 generates the 16 reference gamma voltages GM1 through GMA16 having different voltage levels and supplies them to the data driver 4.

To apply analog data to each of the data lines DL1 through DLm every horizontal period (i.e., 16.67 ms when the frame frequency Vsync is 60 Hz), the data driver 4 is provided with a plurality of data driving ICs (not shown). The data driving ICs apply analog data to the data lines DL1 through DLm in response to the data control signals SSP, SSC, SOE, REV, POL, etc. from the timing controller 8. FIG. 3 is a block diagram of the data driver 4 of FIG. 1. As shown in FIG. 3, each of the data driving ICs includes a shift register portion 14 for applying sequential sampling signals, a latch portion 16 for sequentially latching the digital data Data in response to the sampling signals to output them simultaneously, a digital to analog converter (DAC) 18 for converting the digital data Data from the latch portion 16 into analog data AData, and an output buffer portion 26 for buffering and outputting the analog data AData.

Also, the data driver 4 includes a signal generator 10 for relaying the data control signals SSP, SSC, SOE, REV, POL, etc. and the digital data Data, and a gamma voltage part 12 for supplying positive and negative gamma voltages required for the DAC 18. Each of the data driving ICs drives each of the data lines DL1 through DLn. The signal generator 10 controls the various control signals SSP, SSC, SOE, REV, POL, etc. and the digital Data to output them to their corresponding elements.

The gamma voltage part 12 sub-divides the 16 reference gamma voltages GM1 through GMA16 for each gray level using an internal R-String and outputs them. FIG. 4 is a circuit diagram of the gamma voltage part 12 of FIG. 3. As shown in FIG. 4, the gamma voltage part 12 outputs 256 positive gamma voltages V0 through V255 having different voltage levels from each of nodes between the internal R-string to the DAC 18. That is, a plurality of resistors R1 through R257 are connected in series between a supply voltage source VDD and a ground voltage source GND. Further, the gamma voltage part 12 generates 256 negative gamma voltages (not shown) and supplies them to the DAC 18. The shift register portion 14 includes n shift registers for sequentially shifting a source start pulse SSP from the signal generator 10 in response to a source sampling clock signal SSC, and output the source start pulse SSP as a sampling signal.

To sequentially sample the digital data Data from the signal generator 10 for a certain unit in response to the sampling signals to latch them, the latch portion 16 is provided with n latches to latch n digital data Data, wherein each of the latches has a dimension corresponding to the bit number of the digital data Data. Particularly, the timing controller 8 divides the digital data Data into the even data EVEN Data and the odd data ODD Data so as to reduce a transmission frequency, and simultaneously outputs them over each transmission line. Herein, each of the even data EVEN Data and the odd data ODD Data includes red (R), green (G) and blue (B) data. Thus, the latch portion 16 simultaneously latches the even data EVEN Data and the odd data ODD Data, namely, 6 digital data Data supplied via the signal generator 10 for each sampling signal. Then, the latch portion 16 simultaneously outputs the n latched data Data in response to a source output enable signal SOE from the signal generator 10. Herein, the latch portion 16 restores the digital data Data modulated such that the transition bit number is reduced in response to a data inversion selection signal REV, and outputs them. Specifically, the timing controller 8 modulates the digital data Data having the transited bit number going beyond a reference value such that the transition bit number is reduced, thereby minimizing an electromagnetic interference (EMI) upon data transmission.

To simultaneously convert the digital data Data from the latch portion 16 into the positive and negative analog data AData and output them, as shown in FIG. 3, the DAC 18 is provided with a positive (P) decoding part 20 and a negative (N) decoding part 22 commonly connected to the latch portion 16, and a multiplexer (MUX) part 24 for selecting output signals of the P decoding part 20 and the N decoding part 22. The P decoding part 20 includes n P decoders for converting the n data Data simultaneously input from the latch portion 16 into the positive analog data AData using positive gamma voltages from the gamma voltage part 12. The N decoding part 22 includes n N decoders for converting the n data Data simultaneously input from the latch portion 16 into the negative analog data AData using negative gamma voltages from the gamma voltage part 12. The multiplexer part 24 includes n multiplexers for selectively outputting the positive analog data AData from the P decoder 20 or the negative analog data AData from the N decoder 22 in response to the polarity control signal POL from the signal generator 10.

The output buffer portion 26 includes n output buffers having voltage followers, etc. connected in series to the respective the data lines DL1 through DLn. The n output buffers make a signal buffering of the analog data AData from the DAC 18 and apply them to the data lines DL1 through DLn.

The related art LCD employs the DAC 18, which is supplied with the positive and negative gamma voltages from the gamma voltage part 12, to convert the digital data Data output from the timing controller 8 into the analog data Adata and apply them to the LCD panel 2. FIG. 5 is a waveform diagram illustrating an analog data supplied to the LCD panel 2 of FIG. 1. As shown in FIG. 5, the LCD panel 2 displays a desired picture by the analog data AData between a black and a white supplied to the liquid crystal cell 7 during one frame period (i.e., 16.7 ms).

The related art LCD requires 256 positive gamma voltages V0 through V255 having different voltage levels as well as 256 negative gamma voltages, and supplies them to the DAC 18 of the data driver 4 to display 8-bit data Data on the LCD panel 2 during one frame period (i.e., 16.7 ms) using a frame frequency Vsync of 60 Hz. Thus, the gamma voltage part 12 of each of the data driving ICs occupies a large area because the length of the internal R-String becomes very long by generating 256 positive gamma voltages V0 through V255 having different voltage levels and 256 negative gamma voltages. As a result, the related art LCD has a problem in that an area for arranging the data driver 4 having the data driving ICs is enlarged due to a large size of the gamma voltage part 12 of each data driving IC.

SUMMARY OF THE INVENTION

Accordingly, the present invention is directed to a liquid crystal display (LCD) and a method of driving the LCD that substantially obviates one or more problems due to limitations and disadvantages of the related art.

An object of the present invention is to provide an LCD with a simplified structure of a data driving circuit and a method of driving the LCD.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the present invention, as embodied and broadly described, the LCD includes an LCD panel, a frequency multiplier to multiply a frame frequency to generate a multiplied frame frequency that includes an odd frame and an even frame, a data converter to modulate N-bit input data supplied in accordance with the odd and even frames from the frequency multiplier into (N−1)-bit data, and a data driver to apply the (N−1) bit data from the data converter to the LCD panel.

In another aspect, the method of driving the LCD includes multiplying a frame frequency to form a multiplied frame frequency that includes an odd frame and an even frame, modulating N-bit input data supplied in accordance with the odd and even frames into (N−1) bit data, and converting the (N−1) data into analog data and applying the analog data to an LCD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, the preferred embodiments of the present invention will be described in detail with reference to FIGS. 6 to 12.

Figure 1:
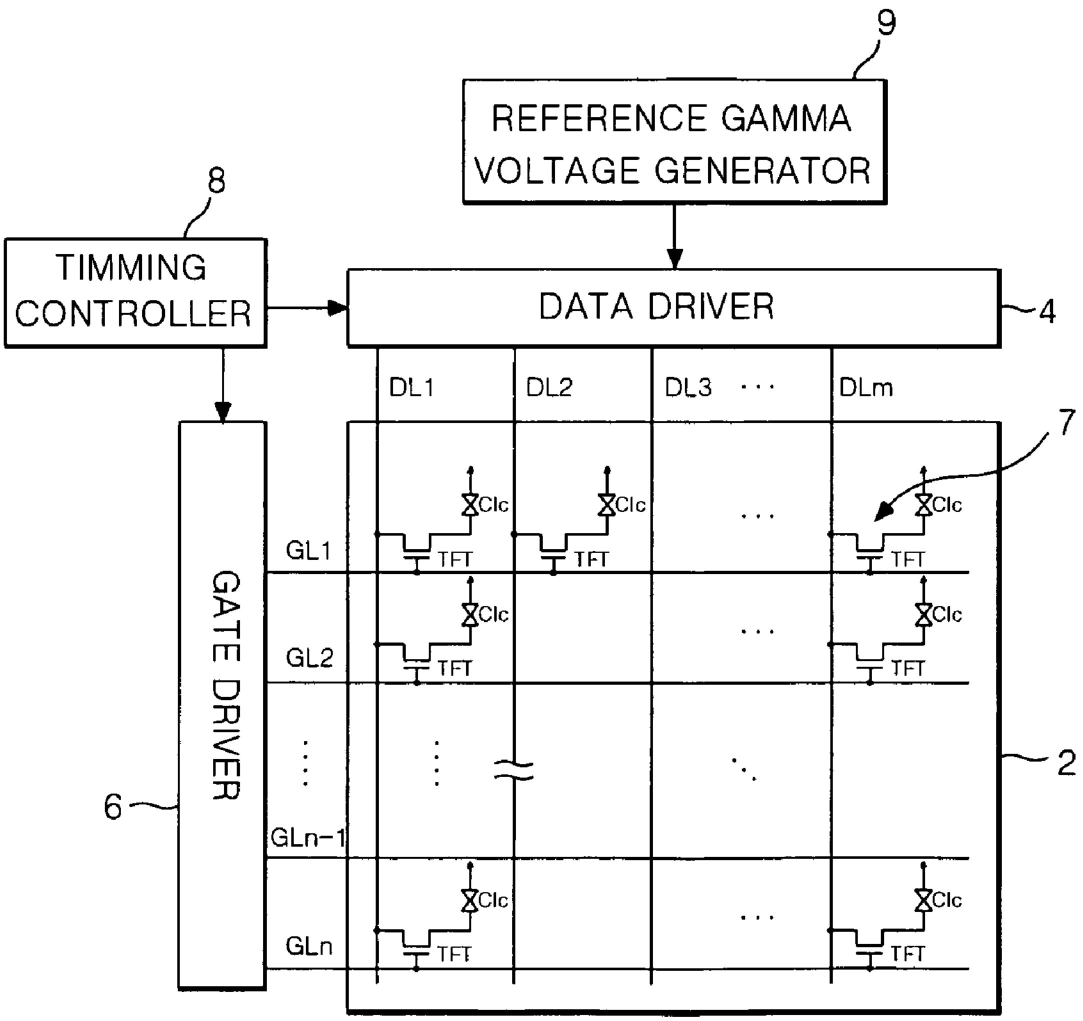
FIG. 1 RELATED ART
FIG. 1 is a schematic block circuit diagram illustrating a configuration of a related art liquid crystal display.
Figure 2:
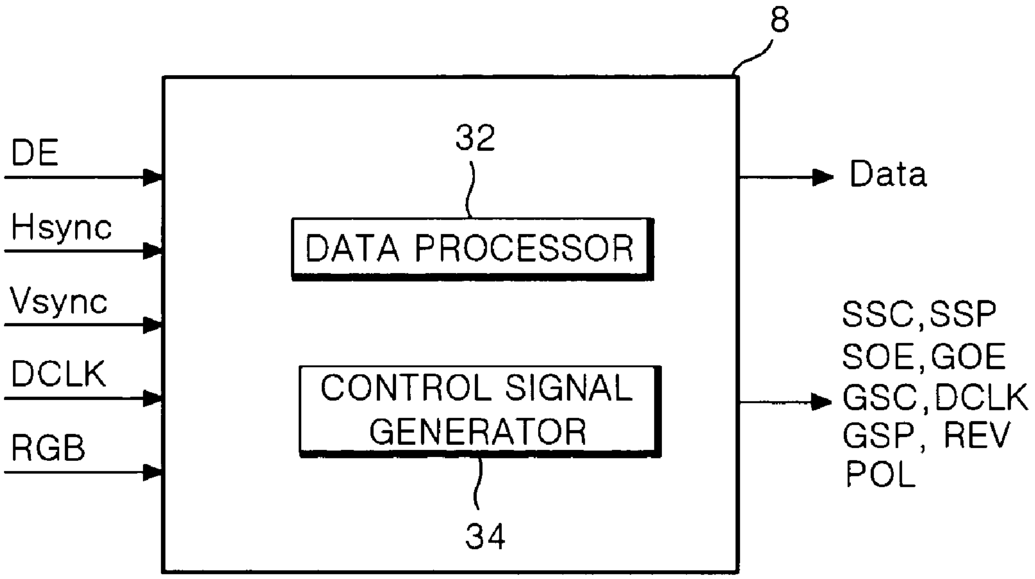
FIG. 2 RELATED ART
FIG. 2 is a block diagram of a timing controller of FIG. 1.
Figure 3:
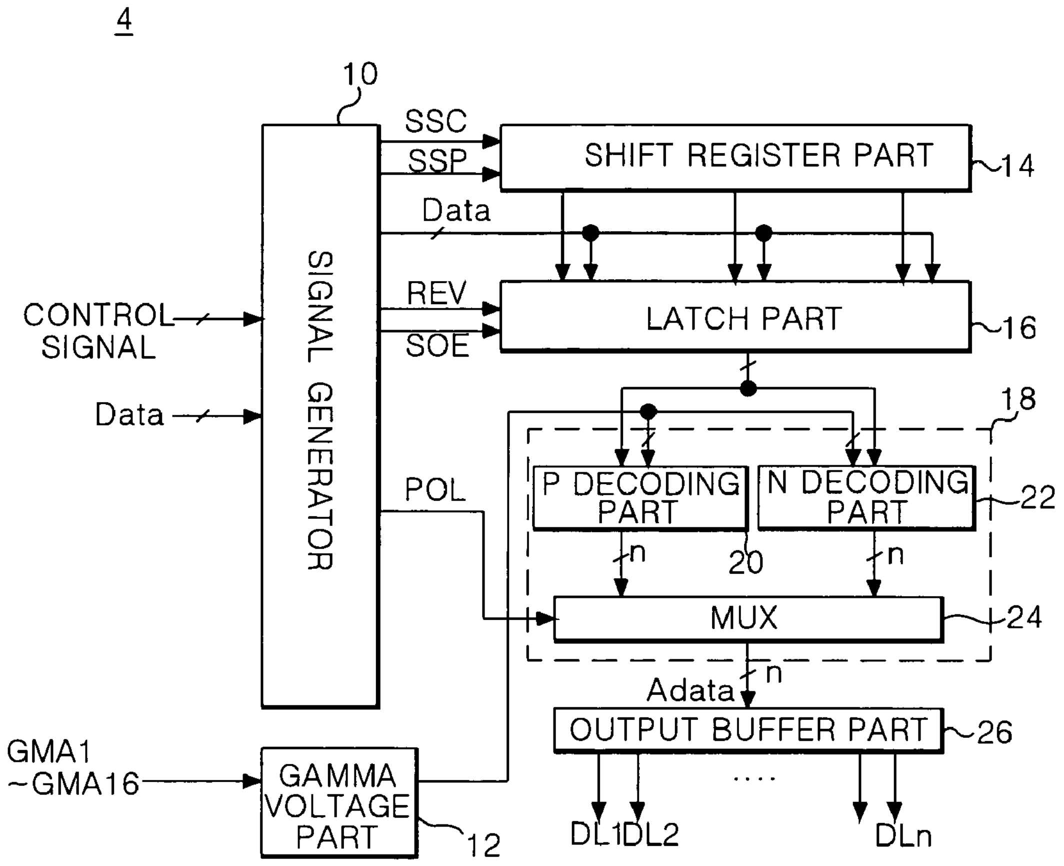
FIG.3 RELATED ART
FIG. 3 is a block diagram of a data driver of FIG. 1.
Figure 4:
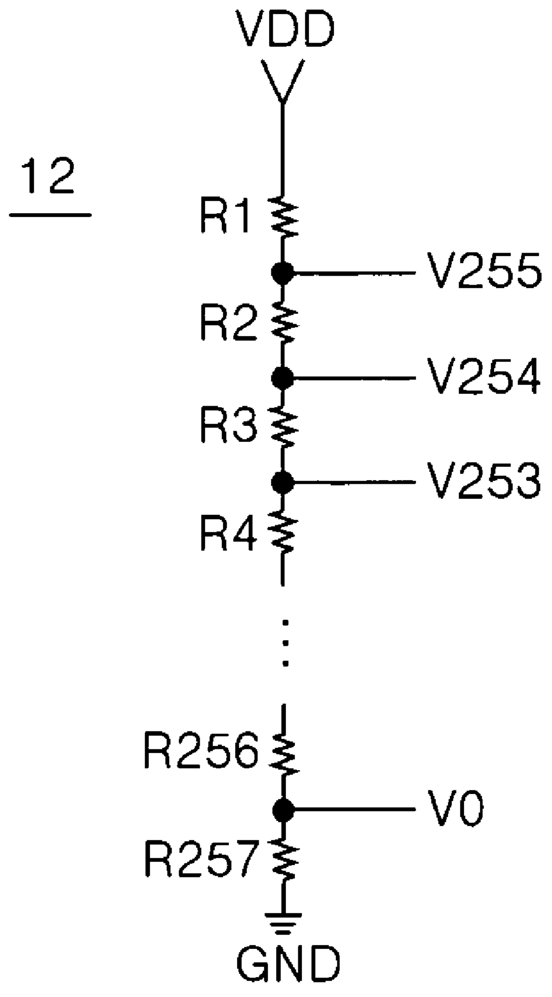
FIG. 4 RELATED ART
FIG. 4 is a circuit diagram illustrating a gamma voltage part of FIG. 3.
Figure 5:
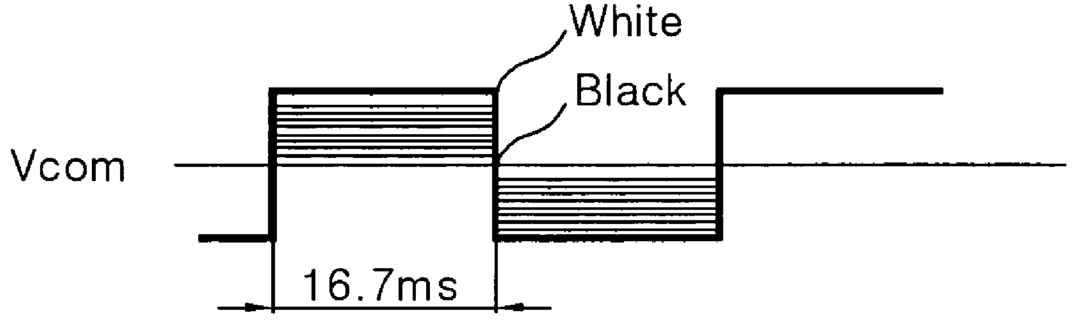
FIG.5 RELATED ART
FIG. 5 is a waveform diagram illustrating analog data supplied to a liquid crystal display (LCD) panel of FIG. 1.
Figure 6:
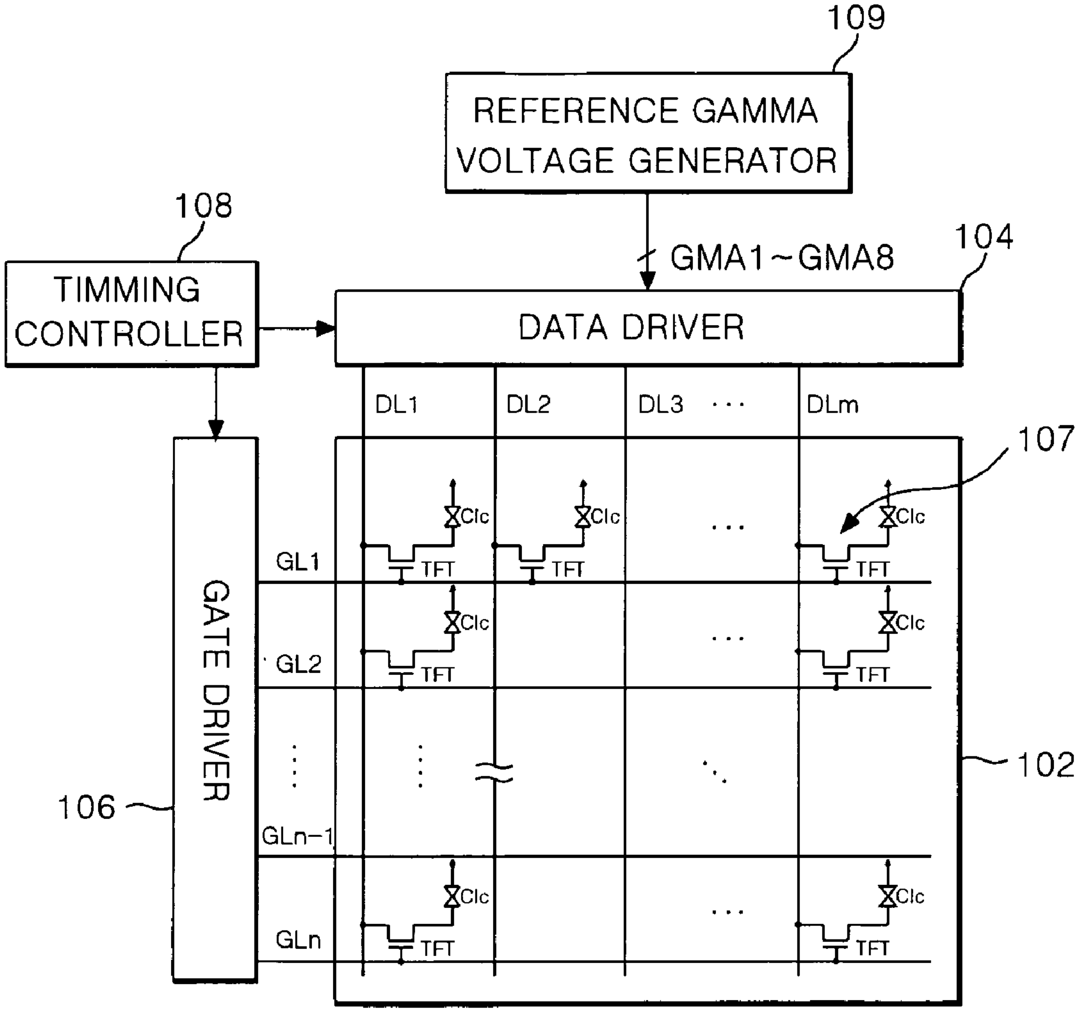
FIG. 6 is a schematic block circuit diagram illustrating a configuration of an LCD according to an exemplary embodiment of the present invention.

FIG. 6 schematically shows a liquid crystal display (LCD) according to an exemplary embodiment of the present invention. As shown in FIG. 6, the LCD includes an LCD panel 102 having liquid crystal cells arranged in a matrix form, a data driver 104 for driving data lines DL1 through DLm of the LCD panel 102, a gate driver 106 for driving gate lines GL1 through GLn of the LCD panel 102, a timing controller 108 for controlling the data driver 104 and the gate driver 106, and a reference gamma voltage generator 109 for supplying 16 reference gamma voltages GM1 through GMA16 to the data driver 104.

Also, the LCD panel 102 includes a thin film transistor TFT provided at each intersection between the gate lines GL1 through GLn and the data lines DL1 through DLm, and a liquid crystal cell 107 connected to the thin film transistor TFT. The thin film transistor TFT is turned on at the time of receiving a scanning signal, namely, a gate high voltage VGH from the gate line GL, thereby applying an analog data from the data line DL to the liquid crystal cell 107. On the other hand, the thin film transistor TFT is turned off at the time of receiving a gate low voltage VGL from the gate line GL, thereby keeping the analog data charged in the liquid crystal cell 107.

The liquid crystal cell 107 may be equivalently regarded as a liquid crystal capacitor. The liquid crystal cell 7 includes a common electrode and a pixel electrode connected to the thin film transistor. The common electrode and pixel electrode are opposed to each other and a liquid crystal is arranged therebetween. Also, the liquid crystal cell 107 includes a storage capacitor for keeping a stable maintenance of the charged analog data signal until the analog data is charged. This storage capacitor is provided between the pixel electrode and a pre-stage gate line. The liquid crystal cell 7 varies an alignment state of the liquid crystal having a dielectric anisotropy in accordance with an analog data charged through the thin film transistor TFT to control light transmittance, thereby implementing gray scale levels.

Figure 7:
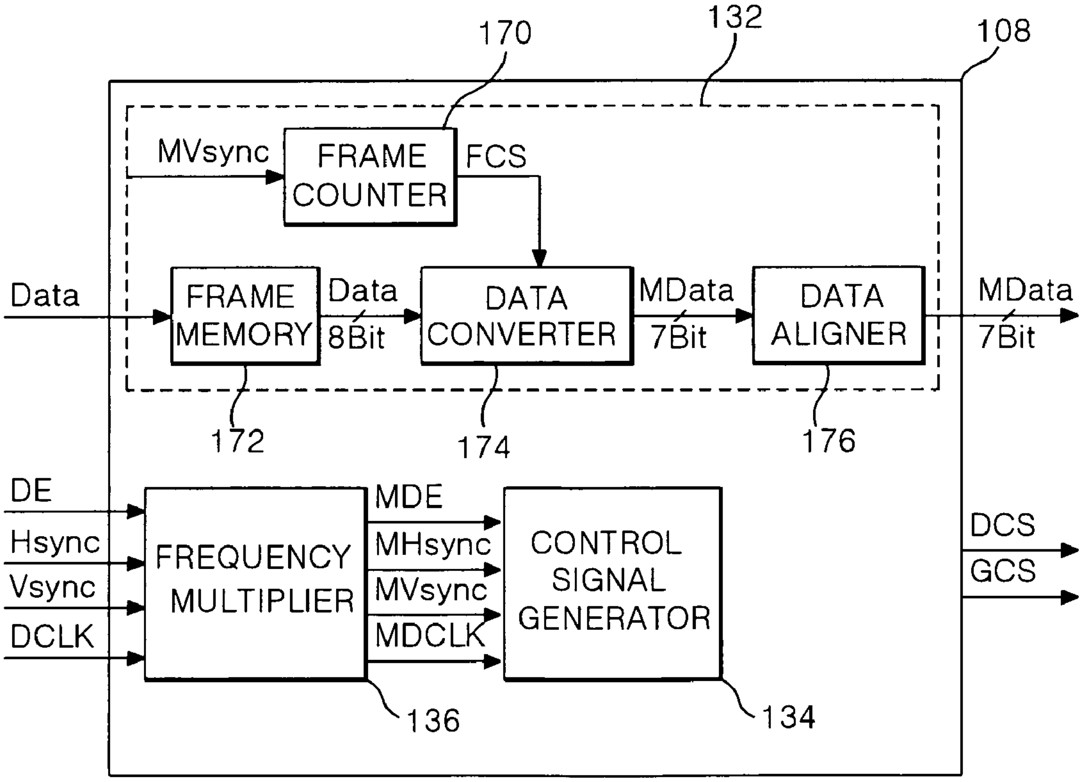
FIG. 7 is a block diagram illustrating a timing controller of FIG. 6.

FIG. 7 is a block diagram illustrating the timing controller 108 of FIG. 6. As shown in FIG. 7, the timing controller 108 generates gate control signals GSP, GSC, GOE, etc. for controlling the gate driver 106 and data control signals SSP, SSC, SOE, POL, etc. for controlling the data driver 104 based on various control signals DE, Hsync, Vsync and DCLK supplied externally. Also, the timing controller 108 converts 8-bit data Data supplied externally into 7-bit modulated data Mdata, aligns the 7-bit modulated data Mdata so that they are suitable for driving the LCD panel 102, and applies them to the data driver 104.

Specifically, the timing controller 108 includes a frequency multiplier 136 for multiplying the various external control signals DE, Vsync, Hsync and DCLK by two, a data processor 132 for converting the 8-bit data into the 7-bit modulated data MData and aligning the converted 7-bit modulated data MData so that they are suitable for driving the LCD panel 102, and a control signal generator 134 for generating gate control signals GCS (i.e., GSP, GSC, GOE, etc.) and data control signals DCS (i.e., SSP, SSC, SOE, POL, REV, etc.) using various multiplied control signals MDE, MVsync, Mhsync, MDCLK, etc. from the frequency multiplier 136.

More specifically, the frequency multiplier 136 multiplies the various control signals DE, Vsync, Hsync and DCLK by two to apply them to the control signal generator 134, and applies the multiplied frame frequency MVsync to the data processor 132. Herein, the multiplied frame frequency MVsync has 120 Hz. Thus, one frame period becomes 8.33 ms that is a half of the one frame period (i.e., 16.7 ms) in the related art.

The control signal generator 134 generates the data control signals DCS (i.e., SSP, SSC, SOE, REV, POL, etc.) to apply them to the data driver 104, and meanwhile, generates the gate control signals GCS (i.e., GSC, GSP, GOE, etc.) to apply them to the gate driver 106 with the aid of the various multiplied control signals MDE, MVsync, MHsync and MDCLK from the frequency multiplier 136.

The data processor 132 includes a frame counter 170 for counting the multiplied frame frequency MVsync from the frequency multiplier 136, a frame memory 172 for storing 8-bit data Data of one frame supplied externally and for storing the stored 8-bit data Data of one frame during two frames, a data converter 174 for modulating the 8-bit data Data supplied from the frame memory 172 into 7-bit data MData in response to a frame counting signal FCS from the frame counter 170, and a data aligner 176 for aligning the modulated 7-bit data MData supplied from the data converter 174 so that they are suitable for driving the LCD panel 102, and applying them to the data driver 104.

The frame memory 172 stores the 8-bit data Data supplied externally for each one frame. The 8-bit data Data of one frame stored in the frame memory 172 is supplied to the data converter 174 during two frames. In other words, the 8-bit data Data of one frame stored in the frame memory 172 are accessed by the multiplied frame frequency MVsync of 120 Hz to be supplied to the data converter 174.

The frame counter 170 counts the multiplied frame frequency MVsync to thereby generate a low-state ('0') frame counting signal FCS at the time of corresponding to an odd frame, and to generate a high-state ('1') frame counting signal FCS at the time of corresponding to an even frame.

The data converter 174 modulates the 8-bit data Data for each one frame supplied from the frame memory 172 into 7-bit data MData for each one frame in response to the frame counting signal FCS from the frame counter 170 with the aid of a look-up table such as the following Table 1, and applies the modulated 7-bit data MData to the data aligner 176.

TABLE 1

| Data (8Bit) | Odd Frame (FCS = 0) Mdata (7Bit) | Even Frame (FCS = 1) MData (7Bit) |
|---|---|---|
| 00000000 | 0000000 | 0000000 |
| 00000001 | 0000001 | 0000000 |
| 00000010 | 0000010 | 0000000 |
| . | . | . |
| . | . | . |
| . | . | . |
| 01111111 | 1111111 | 0000000 |
| 10000000 | 1111111 | 0000000 |
| 10000001 | 1111111 | 0000001 |
| . | . | . |
| . | . | . |
| . | . | . |
| 11111101 | 1111111 | 1111101 |
| 11111110 | 1111111 | 1111110 |
| 11111111 | 1111111 | 1111111 |

Specifically, as shown Table 1, if a low-state ('0') frame counting signal FCS is applied from the frame counter 170, then the data converter 174 applies data MData of 0000000 through 1111111 excluding the most significant bit to the data aligner 176 when the 8-bit data Data of one frame supplied from the frame memory 172 are 0000000 through 01111111 and, at the same time, modulates a data value of 0000000 through 1111111 excluding the most significant data value into 1111111 when they are 10000000 through 11111111 to apply them to the data aligner 176. On the other hand, if a high-state ('1') frame counting signal FCS is applied from the frame counter 170, then the data converter 174 modulates a data value into a data value of 0000000 when the 8-bit data Data of one frame supplied from the frame memory 172 are 0000000 through 01111111 to apply them to the data aligner 176 and, at the same time, applies a data MData of 0000000 through 1111111 excluding the most significant data value to the data aligner 176 when they are 10000000 through 11111111. The data aligner 176 aligns the modulated 7-bit data MData supplied from the data converter 174 into odd data ODD MData and even data EVEN MData so that the aligned data MData are suitable for driving the LCD panel 102, and supplies them to the data driver 104.

To sequentially drive the gate lines GL1 through GLn, the gate driver 106 is provided with a plurality of gate driving integrated circuits (ICs) (not shown). The gate driving ICs sequentially drive the gate lines GL1 through GLn connected thereto under control of the timing controller 108. In other words, the gate driving ICs sequentially apply a gate high voltage VGH to the gate lines GL1 through GLn in response to the gate control signals GSP, GSC, GOE, etc. supplied from the timing controller 108.

The reference gamma voltage generator 109 generates eight (8) reference gamma voltages GMA1 through GMA8 having different voltage levels to supply them to the data driver 104. To apply an analog data for each one line to the data lines DL1 through DLm every frame period (i.e., 8.33 ms), the data driver 104 is provided with a plurality of data driving ICs (not shown). The data driving ICs apply an analog data to the data lines DL1 through DLm in response to the data control signals DCS (i.e., SSP, SSC, SOE, POL, etc.) supplied from the timing controller 108.

Figure 8:
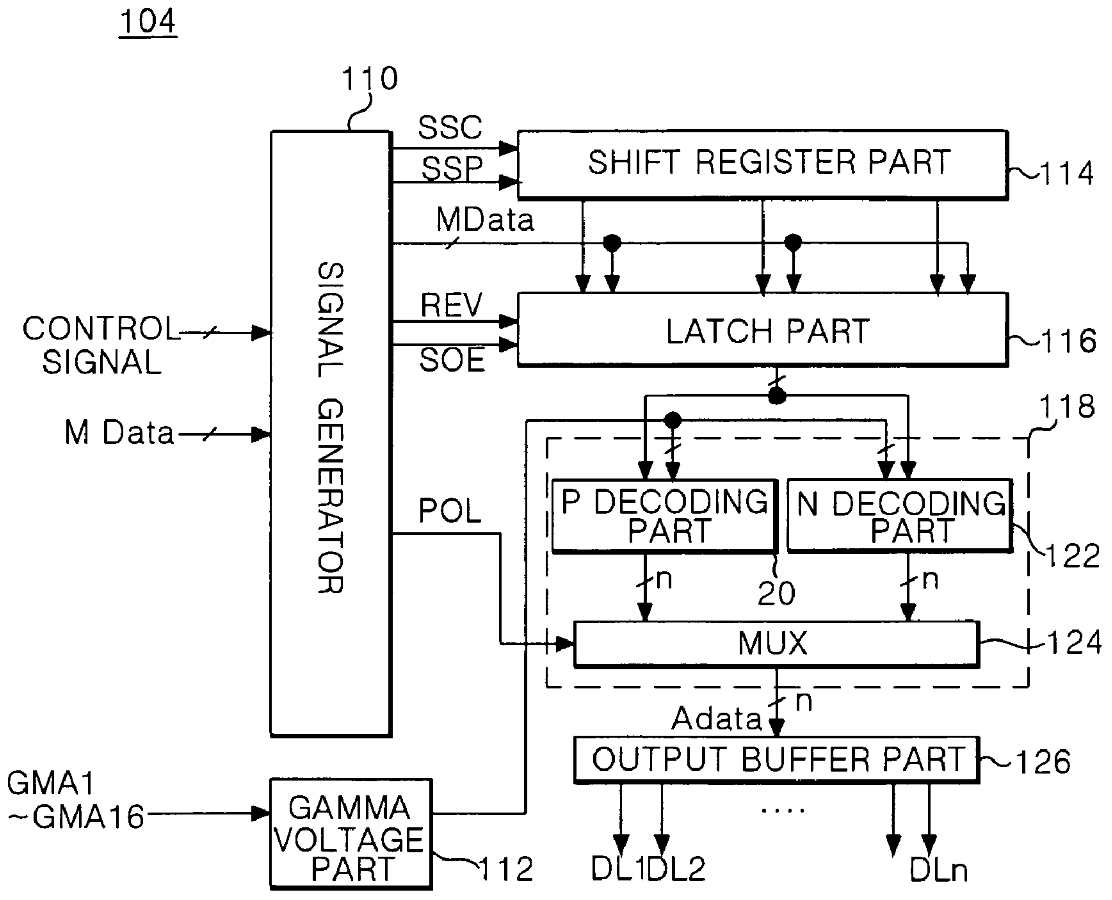
FIG. 8 is a block diagram illustrating a data driver of FIG. 6.

FIG. 8 is a block diagram illustrating the data driver 104 of FIG. 6. As shown in FIG. 8, each of the data driving ICs includes a shift register portion 114 for applying sequential sampling signals, a latch portion 116 for sequentially latching the modulated 7-bit data MData supplied from the data aligner 176 in response to the sampling signals to output them simultaneously, a digital to analog converter (DAC) 118 for converting the modulated 7-bit data MData from the latch portion 116 into analog data AData, and an output buffer portion 126 for buffering the analog data AData from the DAC 18 to output them.

Also, the data driver 104 includes a signal generator 110 for relaying the data control signals SSP, SSC, SOE, REV, POL, etc. supplied from the timing controller 108 and the modulated 7-bit data MData, and a gamma voltage part 112 for supplying positive and negative gamma voltages required for the DAC 118. Each data driving IC having the above-mentioned configuration drives each of the data lines DL1 through DLn.

The signal generator 110 controls various control signals (i.e., SSP, SSC, SOE, REV, POL, etc.) from the timing controller 108 and the modulated 7-bit data MData to output them to their corresponding elements.

Figure 9:
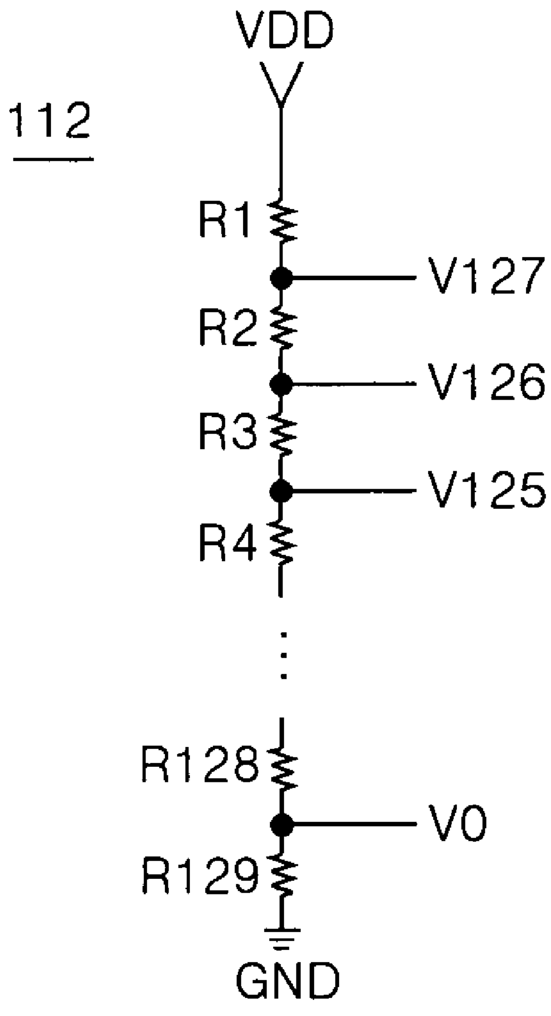
FIG. 9 is a circuit diagram illustrating a gamma voltage part of FIG. 8.

The gamma voltage part 112 sub-divides 8 reference gamma voltages GMA1 through GMA8 inputted from the reference gamma voltage generator 109 for each gray level. FIG. 9 is a circuit diagram illustrating the gamma voltage part 112 of FIG. 8. As shown in FIG. 9, the gamma voltage part 112 outputs 128 positive gamma voltages V0 through V127 to the DAC 118. The 128 positive gamma voltages V0 through V127 have different voltage levels from each of nodes between a plurality of resistors R1 through R129 connected in series between a supply voltage source VDD and a ground voltage source GND to the DAC 118. Further, the gamma voltage part 112 generates 128 negative gamma voltages (not shown) to supply them to the DAC 118. Herein, the supply voltage source VDD has the same voltage value as the supply voltage source of the gamma voltage part for converting the 8-bit data in the related art into 256 different gamma voltages. Accordingly, the gamma voltage part 112 sub-divides voltage values between the supply voltage source VDD and the ground voltage source GND identical to the prior art, into 128 gamma voltages having different voltage levels, and applies them to the DAC 118.

The shift register portion 114 includes n shift registers for sequentially shifting a source start pulse SSP from the signal generator 110 in response to a source sampling clock signal SSC, and output the source start pulse SSP as a sampling signal. To sequentially sample the modulated 7-bit data MData from the signal generator 110 by a certain unit in response to the sampling signals from the shift register portion 114 to latch them, the latch portion 116 is provided with latches so as to latch the modulated 7-bit data MData, and each of the latches has a dimension corresponding to the bit number of the modulated 7-bit data MData. Particularly, the timing controller 108 divides the modulated 7-bit data MData into even data EVEN Data and odd data ODD Data so as to reduce a transmission frequency, and simultaneously outputs them over each transmission line. Herein, each of the even data EVEN Data and the odd data ODD Data includes red (R), green (G) and blue (B) data. Thus, the latch portion 116 simultaneously latches the even data EVEN Data and the odd data ODD Data, namely, modulated 7-bit data MData supplied via the signal generator 110 for each sampling signal. Then, the latch portion 116 simultaneously outputs the latched modulated 7-bit data MData in response to a source output enable signal SOE from the signal generator 110. In this exemplary case, the latch portion 116 restores the modulated 7-bit data MData such that the transition bit number is reduced in response to a data inversion selection signal REV to output them. This is because the timing controller 8 modulates the modulated 7-bit data MData having the transited bit number going beyond a reference value such that the transition bit number is reduced so as to minimize an electromagnetic interference (EMI) upon data transmission.

To simultaneously convert the modulated 7-bit data MData from the latch portion 116 into positive and negative analog data AData to output them, the DAC 118 is provided with a positive (P) decoding part 120 and a negative (N) decoding part 122 commonly connected to the latch portion 116, and a multiplexer (MUX) part 124 for selecting output signals of the P decoding part 120 and the N decoding part 122.

The P decoding part 120 includes n P decoders for converting the modulated 7-bit data MData simultaneously input from the latch portion 116 into positive analog data AData using 128 positive gamma voltages V0 through V127 from the gamma voltage part 112. On the other hand, the N decoding part 122 includes n N decoders for converting the modulated 7-bit data MData simultaneously input from the latch portion 116 into negative analog data AData using negative gamma voltages from the gamma voltage part 112. The multiplexer part 124 includes n multiplexers for selectively outputting the positive analog data AData from the P decoder 120 or the negative analog data AData from the N decoder 122 in response to a polarity control signal POL from the signal generator 110.

The output buffer portion 126 includes n output buffers that are provided with voltage followers, etc., connected in series to the respective n data lines DL1 through DLn. The output buffers make a signal buffering of the analog data AData from the DAC 118 to apply them to the data lines DL1 through DLn.

Figure 10:
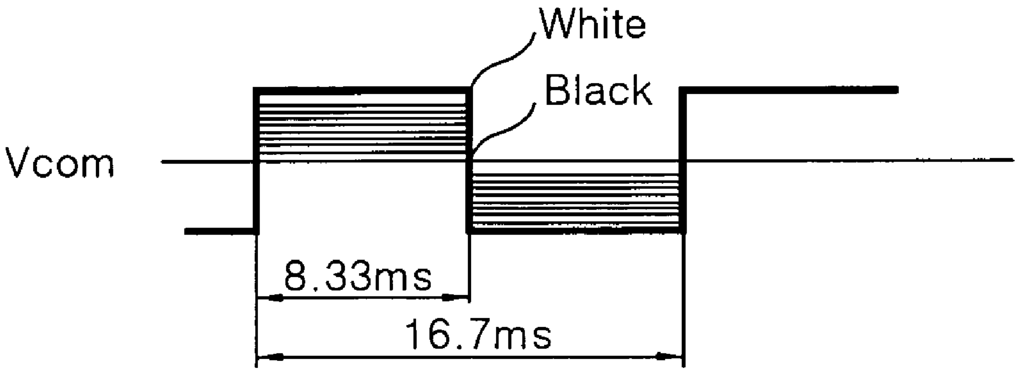
FIG. 10 is a waveform diagram illustrating analog data supplied to an LCD panel of FIG. 6.

The LCD according to the exemplary embodiment converts the 7-bit modulated data NData outputted from the timing controller 108 into the corresponding analog data AData using the positive and negative gamma voltages having 128 gray level values from the gamma voltage part 112 to apply them to the LCD panel 102. FIG. 10 is a waveform diagram illustrating analog data supplied to the LCD panel 102 of FIG. 6. As shown in FIG. 10, the LCD panel 102 displays a desired picture by the analog data AData between a black and a white supplied to the liquid crystal cell 107 during one frame period (i.e., 8.33 ms).

Figure 11:
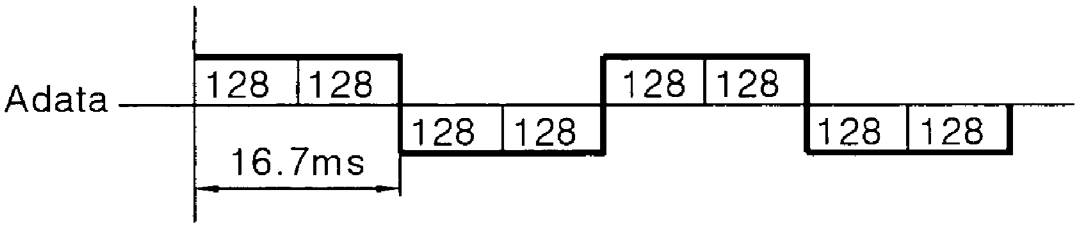
FIG. 11 is a waveform diagram illustrating a data signal supplied to the LCD panel of FIG. 6 during an odd-numbered frame.

FIG. 11 is a waveform diagram illustrating a data signal supplied to the LCD panel 102 of FIG. 6 during an odd-numbered frame. The LCD according to the exemplary embodiment displays the analog data AData (i.e. white signal) corresponding to a data value of 1111111 on the liquid crystal cell 107 during the odd-numbered frame (i.e. 8.33 ms) while displaying the analog data AData corresponding to the remaining 7-bit data MData excluding the most significant bit on the liquid crystal cell 107 during the even-numbered frame (i.e., 8.33 ms), as shown in FIG. 11, when a value of the input data Data supplied externally is more than 128.

Figure 12:
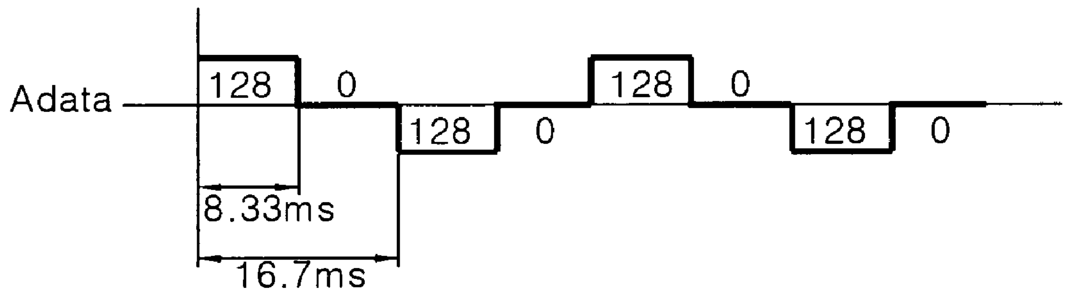
FIG. 12 is a waveform diagram illustrating a data signal supplied to the LCD panel of FIG. 6 during an even-numbered frame.

FIG. 12 is a waveform diagram illustrating a data signal supplied to the LCD panel 102 of FIG. 6 during an even-numbered frame. The LCD according to the exemplary embodiment of the present invention displays the analog data AData corresponding to a value of the remaining 7-bit data MData excluding the most significant bit on the liquid crystal cell 107 during the odd-numbered frame (i.e. 8.33 ms) while displaying the analog data AData (i.e., black signal) corresponding to a data value of 0000000 on the liquid crystal cell 107 during the even-numbered frame (i.e., 8.33 ms), as shown in FIG. 12, when a value of the input data Data supplied externally is less than 128. Thus, the LCD modulates the 8-bit input data Data into the 7-bit data MData using a frame frequency MVsync of 120 Hz to apply the analog data AData having 0 to 127 gray level values corresponding to the modulated data MData to each of the two frames (i.e., 8.33 ms) corresponding to one frame (i.e., 16.7 ms) in the prior art, thereby expressing 256 gray levels in the prior art.

Accordingly, in the LCD according to the exemplary embodiment, the gamma voltage part 112 included in each of the data driving ICs generates 128 positive gamma voltages V0 to V127 having different voltage levels and negative gamma voltages, thereby reducing the length of the internal R-String of the conventional gamma voltage part to a half. As a result, the LCD according to the exemplary embodiment can reduce the length of the internal R-String of the gamma voltage part 112, thereby reducing a dimension of the data driver 104 as well as simplifying the structure thereof.

Moreover, the LCD according to the exemplary embodiment can display a (N+1)-bit input data on the LCD panel 102 with the aid of the data driver 104 for converting an N-bit data into an analog data. Accordingly, the LCD according to the exemplary embodiment can simplify the structure of the data driver 104 while keeping the bit number of the input data as they are.

As described above, the LCD and method of driving the LCD according to the exemplary embodiment of the present invention modulates the N-bit input data into the (N−1)-bit data and makes a two-division of the input data during the conventional one frame in accordance with the modulated (N−1)-bit data using the frame frequency multiplied by two, thereby displaying gray level values corresponding to the N-bit input data on the LCD panel. Accordingly, an area of the gamma voltage part for generating the gamma voltages can be reduced to a half of the prior art, thereby reducing a dimension of the data driver as well as simplifying the structure thereof. Furthermore, the LCD and the driving method thereof according to the present invention can display the (N+1)-bit input data on the LCD panel with the aid of the frequency multiplier for multiplying the frame frequency and the data driver for converting the N-bit data into the analog data, thereby simplifying the structure of the data driver.

It will be apparent to those skilled in the art that various modifications and variations can be made in the LCD and the method of driving the LCD of the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:

an LCD panel;

a frequency multiplier to multiply a frame frequency to generate a multiplied frame frequency, the multiplied frame frequency including an odd frame and an even frame;

a data converter to modulate N-bit input data (N being an integer) supplied in accordance with the odd and even frames from the frequency multiplier into (N−1)-bit data; and a data driver to convert the (N−1) bit data from the data converter into analog data and apply the analog data to the LCD panel, wherein, when a frame discriminating signal corresponds to the odd frame, the data converter modulates the N-bit input data into a data value corresponding to a white signal and outputs the data value if the N-bit input data has a value equal to or greater than a half of $2^{N,}$ and outputs the N-bit input data excluding a most significant bit thereof if the N-bit input data has a value less than a half of $2^{N,}$ wherein, when the flame discriminating signal corresponds to the even flame, the data converter outputs the N-bit input data excluding a most significant bit thereof if the N-bit input data has a value equal to or greater than a half of $2^{N}$, and modulates the N-bit input data into a data value corresponding to a black signal and output the data value if the N-bit input data has a value less than a half of $2^{N}$.

2. The device according to claim 1, further comprising:

a flame memory to store the N-bit input data during two frames; and a counter to count the N-bit input data during the two flames to generate the frame discriminating signal corresponding to the odd and even flames.

3. The device according to claim 2, wherein the data converter modulates the N-bit input data from the frame memory into the (N−1)-bit data in response to the frame discriminating signal.

4. The device according to claim 2, further comprising:

a data aligner to re-arrange the (N−1) bit data from the data converter so that the (N−1) data are suitable for driving the LCD panel, and to apply the (N−1) data to the data driver.

5. The device according to claim 1, wherein the data driver includes:

a gamma voltage part to generate a plurality of gamma voltages having different voltage levels corresponding to the (N−1) bits;

a digital-to-analog converter to convert the (N−1)-bit data into positive and negative analog data using the plurality of gamma voltages and to selectively output the positive and negative analog data in response to a polarity control signal supplied externally; and an output part to supply the analog data from the digital-to-analog converter to the LCD panel.

6. The device according to claim 5, wherein the gamma voltage part outputs the plurality of gamma voltages from each of nodes between a plurality of resistors connected in series between a supply voltage and a ground voltage, and wherein the supply voltage has the same voltage level as a white signal corresponding to a most significant value of the N-bit data.

7. A method of driving a liquid crystal display (LCD) device, comprising:

multiplying a frame frequency to form a multiplied frame frequency, the multiplied frame frequency including an odd frame and an even frame;

modulating N-bit input data (N being an integer) supplied in accordance with the odd and even frames into (N−1) bit data; and converting the (N−1) data into analog data and applying the analog data to an LCD panel, wherein modulating the N-bit input data includes:

when a frame discriminating signal corresponds to the odd frame, modulating the N-bit input data into a data value corresponding to a white signal and outputting the data value if the N-bit input data has a value equal to or greater than a half of $2^{N}$; and outputting the N-bit input data excluding a most significant bit thereof if the N-bit input data has a value less than a half of $2^{N}$ when the frame discriminating signal corresponds to the even frame, outputting the N-bit input data excluding a most significant bit thereof if the N-bit input data has a value equal to or greater than a half of $2^{N}$; and modulating the N-bit input data into a data value corresponding to a black signal and outputting the data value if the N-bit input data has a value less than a half of $2^{N}$.

8. The method according to claim 7, further comprising:

storing the input data during two frames; and counting the multiplied frame frequency to generate the frame discriminating signal corresponding to the odd and even frames.

9. The method according to claim 8, wherein modulating the N-bit input data includes modulating the N-bit input data supplied for each frame into the (N−1)-bit data in response to the frame discriminating signal.

10. The method according to claim 7, wherein converting the (N−1) bit data into the analog data and applying the analog data to the LCD panel includes:

generating a plurality of gamma voltages having different voltage levels corresponding to the (N−1) bit data;

converting the (N−1)-bit data into positive and negative analog data using the plurality of gamma voltages; and selectively outputting the analog data in response to a polarity control signal supplied externally and applying the analog data to the LCD panel.

11. The method according to claim 10, wherein generating the plurality of gamma voltages includes outputting the plurality of gamma voltages from each of nodes between a plurality of resistors connected in series between a supply voltage and a ground voltage.

12. The method according to claim 7, further comprising re-arranging the (N−1) bit data so that the (N−1) bit data are suitable for driving the LCD panel.

* * * * *